United States Patent
Dyck et al.

(10) Patent No.: US 7,239,865 B2
(45) Date of Patent: Jul. 3, 2007

(54) PROXY AUTHENTICATION FOR TETHERED DEVICES

(75) Inventors: Jeffrey Alan Dyck, San Diego, CA (US); Marcello Lioy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 843 days.

(21) Appl. No.: 10/627,171

(22) Filed: Jul. 25, 2003

(65) Prior Publication Data

US 2005/0039005 A1    Feb. 17, 2005

(51) Int. Cl.
*H04M 1/66* (2006.01)

(52) U.S. Cl. .................. 455/411; 455/557; 455/569.1; 713/168; 380/247; 380/248; 380/249; 380/270

(58) Field of Classification Search ........... 455/411, 455/557, 569.1; 713/168; 380/247–249, 380/270
See application file for complete search history.

(56) References Cited

U.S. PATENT DOCUMENTS

| 5,668,876 | A  | * | 9/1997  | Falk et al.    | 380/271 |
|-----------|----|---|---------|----------------|---------|
| 6,512,754 | B2 | * | 1/2003  | Feder et al.   | 370/338 |
| 6,745,047 | B1 | * | 6/2004  | Karstens et al.| 455/556.1 |
| 6,785,823 | B1 | * | 8/2004  | Abrol et al.   | 726/7   |
| 6,879,574 | B2 | * | 4/2005  | Naghian et al. | 370/338 |
| 7,152,160 | B2 | * | 12/2006 | Lantto et al.  | 713/168 |
| 2004/0044789 | A1 | * | 3/2004 | Angel et al.   | 709/238 |
| 2004/0219954 | A1 | * | 11/2004 | Odinak        | 455/569.1 |

* cited by examiner

*Primary Examiner*—Nick Corsaro
*Assistant Examiner*—Simon A. Goetze
(74) *Attorney, Agent, or Firm*—Thomas R. Rouse; Timothy F. Loomis; Todd E. Marlette

(57) ABSTRACT

Methods and apparatus are presented herein for allowing a wireless communication device to perform a proxy authentication on behalf of a tethered device.

8 Claims, 3 Drawing Sheets

PROXY AUTHENTICATION FOR TETHERED DEVICES

BACKGROUND

1. Field

The present invention relates generally to wireless communication networks and packet switched data networks. More specifically, the present invention relates to using a wireless communication device to perform a proxy authentication on behalf of a tethered device, wherein the tethered device is using the wireless communication network to access a packet switched data network.

2. Background

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well-known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 (cdma2000 1×EV-DV) and IS-856 (cdma2000 1×EV-DO) and has been approved by the TIA. Another CDMA standard is the W-CDMA standard, as embodied in 3rd Generation Partnership Project "3GPP", Document Nos. 3G TS 25.211, 3G TS 25.212, 3G TS 25.213, and 3G TS 25.214. The W-CDMA standard is in the process of incorporation into a GSM-based system known as Universal Mobile Telecommunications Systems (UMTS).

The telecommunication standards cited above are examples of only some of the various communications systems that can be implemented. One general category of standards is referred to as "Third Generation" or "3G," of which cdma2000 and W-CDMA are both members. These 3G standards are directed towards increased data rates, which will support increased user numbers and data-intensive applications.

Given the growing demand for wireless data applications, the need for very efficient wireless data communication systems has become increasingly significant. One such wireless data application is the transmission of data packets that originate or terminate at packet-switching networks. Various protocols exist for transmitting packetized traffic over packet-switching networks so that information arrives at its intended destination. The primary protocol for transmitting packetized traffic is "The Internet Protocol," Request for Comment (RFC) 791 (September, 1981). The Internet Protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. Another protocol is the Point-to-Point Protocol (PPP), promulgated in RFC 1661 (July 1994), which is an encapsulation protocol for transporting IP traffic over point-to-point links. Yet another protocol is the IP Mobility Support, promulgated in RFC 2002 (October 1996), which is a protocol that provides for transparent outing of IP datagrams to mobile nodes.

Hence, the transmission of IP packets from the IP network over a wireless communication network or from the wireless communication network over the IP network can be accomplished by adherence to a set of protocols, referred to as a protocol stack. A wireless communication device may be the origination or the destination of the IP packet, or alternatively, the wireless communication device may be a transparent link to an electronic device. In either case, payload information is broken into packets wherein header information is added to each packet. The IP header sits on top of the PPP layer, which sits on the RLP layer, which sits on top of the physical layer of the wireless air interface. The RLP layer is the Radio Link Protocol layer, which is responsible for selectively retransmitting packets when a transmission error occurs. In a WCDMA system, the PPP layer sits on the Radio Link Control (RLC) layer, which has a similar functionality as the RLP layer.

Data may be transported over-the-air to a packet data service node (PDSN) via an Access Point (AP), whereupon the data is subsequently sent over an IP network. Using terminology from cellular communication system, an AP may also be thought of as a base station or a base station equivalent. Alternatively, IP packets may be transmitted over an IP network to a PDSN, from a PDSN to an AP, and then over-the-air to a wireless communication device. A wireless communication device may be referred to as an Access Terminal (AT) in the terminology of a wireless communication protocol or alternatively, the wireless communication device may be referred to as a Mobile Node (MN) in the terminology of an IP protocol.

There are numerous difficulties that abound when attempting to wirelessly transfer data that originates or terminates in wired environments. One such difficulty is the authentication of the devices that attempt to access packet data services via wireless communications equipment. Due to the multiplicity of protocols involved in transmitting IP packets over a wireless environment, there are a multiplicity of authentication procedures that must be satisfied if a device tethered to a wireless communication device desires access to a wired network. In one possible scenario, the wireless communication device would be required to satisfy authentication procedures of the wireless network, the tethered device may be required to satisfy authentication procedures of the wired network, and the authentication procedures of one may affect the authentication procedures of the other. Hence, when multiple protocols are used, the implementation of different authentication requirements corresponding to each protocol is possible within an end-to-end communication session. However, to implement different authentication requirements in a timely and computationally efficient fashion is problematic.

SUMMARY

Methods and apparatus are presented herein to address the above stated difficulties. In one aspect, a method is presented for performing a proxy authentication of a device tethered to a wireless unit, the method comprising: intercepting a challenge directed to the tethered device; generating an appropriate response to the challenge without waiting for input from the tethered device; forwarding the challenge to the tethered device; and ignoring a challenge response received from the tethered device.

In another aspect, apparatus within a wireless unit is presented for performing a proxy authentication of a device tethered to the wireless unit, the apparatus comprising: at least one memory element; and at least one processing element configured to execute a set of instructions stored upon the at least one memory element, the set of instructions for: intercepting a challenge directed to the tethered device; generating an appropriate response to the challenge without waiting for input from the tethered device; forwarding the challenge to the tethered device; and ignoring a challenge response received from the tethered device.

In another aspect, apparatus is presented for performing a proxy authentication of a device tethered to a wireless unit, the apparatus comprising: means for intercepting a challenge directed to the tethered device; means for generating an appropriate response to the challenge without waiting for input from the tethered device; means for forwarding the challenge to the tethered device; and means for determining to ignore a challenge response received from the tethered device.

DETAILED DESCRIPTION

Figure 1:
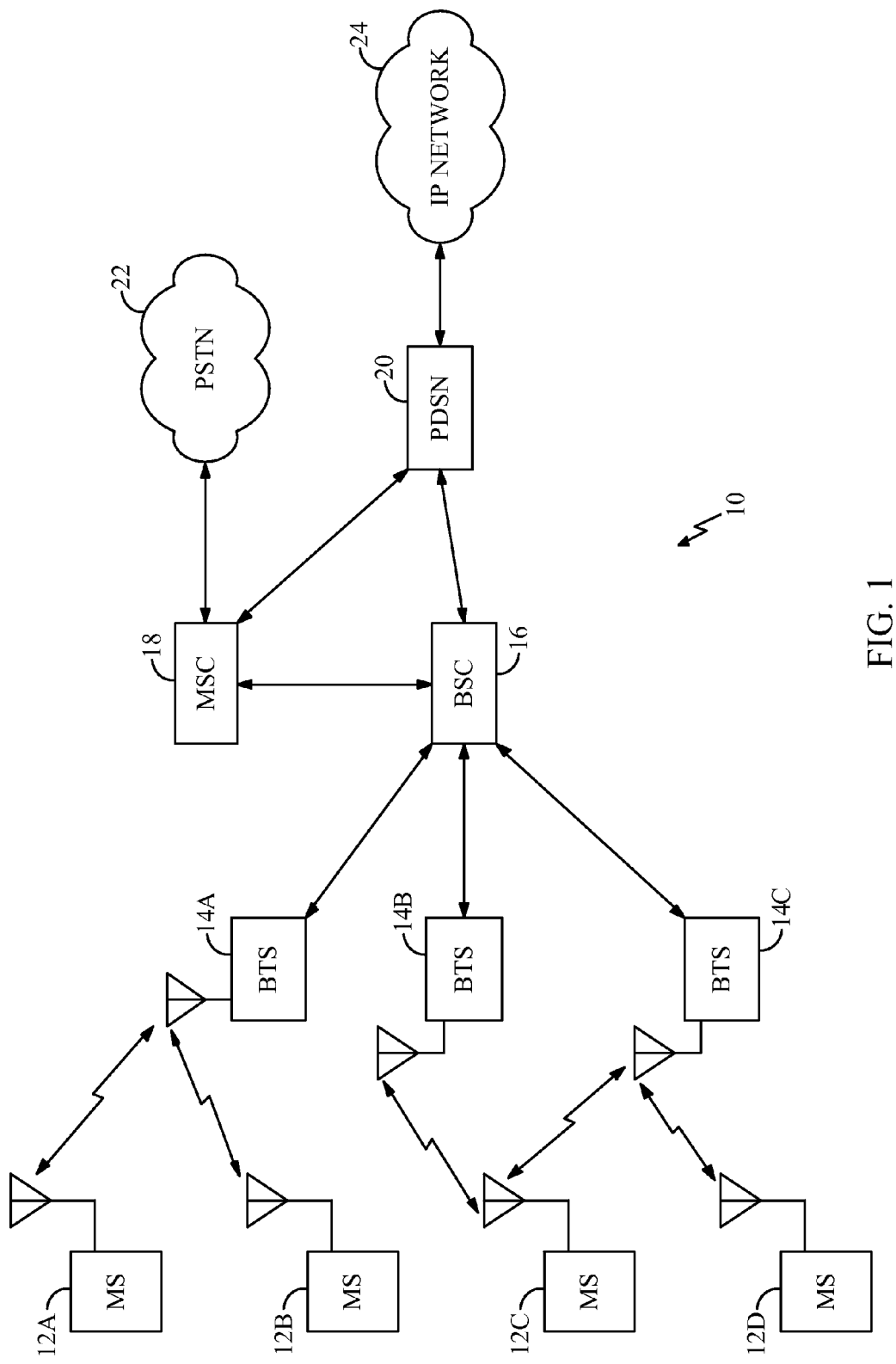
FIG. 1 is a diagram of a wireless communication network.

As illustrated in FIG. 1, a wireless communication network 10 generally includes a plurality of access terminals (also called remote stations, mobile stations, subscriber units, or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and a packet switched data network 24 (typically an Internet Protocol (IP) network). For purposes of simplicity, four access terminals 12a–12d, three base stations 14a–14c, one BSC 16, one MSC 18, and one PDSN 20 are shown. It would be understood by those skilled in the art that there could be any number of access terminals 12, base stations 14, BSCs 16, MSCs 18, and PDSNs 20.

In one embodiment the wireless communication network 10 is a packet data services network. The access terminals 12a–12d may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed: location communication module such as might be found in a wireless local loop or meter reading system. In the most general embodiment, access terminals may be any type of communication unit.

The access terminals 12a–12d may advantageously be configured to perform one or more wireless packet data protocols such as described in, for example, the EIA/TIA/IS-707 standard. In a particular embodiment, the access terminals 12a–12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of reverse link signals from various access terminals 12a–12d engaged in telephone calls, Web browsing, or other data communications. Each reverse link signal received by a given base station 14a–14c is processed within that base station 14a–14c. Each base station 14a–14c may communicate with a plurality of access terminals 12a–12d by modulating and transmitting sets of forward link signals to the access terminals 12a–12d. For example, as shown in FIG. 1, the base station 14a communicates with first and second access terminals 12a, 12b simultaneously, and the base station 14c communicates with third and fourth access terminals 12c, 12d simultaneously. The resulting packets are forwarded to the BSC 16, which provides call resource allocation and mobility management functionality including the orchestration of soft handoffs of a call for a particular access terminal 12a–12d from one base station 14a–14c to another base station 14a–14c. For example, an access terminal 12c is communicating with two base stations 14b, 14c simultaneously. Eventually, when the access terminal 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In a WCDMA system, the terminology of the wireless communication system components differs, but the functionality is the same. For example, a base station can also be referred to as a Radio Network Controller (RNC) operating in a UMTS Terrestrial Radio Access Network (U-TRAN).

In the various existing communication systems, different nomenclature exists for the various formats in which voice and data traffic can be transmitted, such as, e.g. frames, packets, and subpackets. The scope of the embodiments described herein extends to all wireless communication systems using any of the various transmission formats. However, for the purpose of illustrative ease, the term "packets" will be used herein to describe both the transmission channel format in which traffic is carried and the structure of the traffic.

It should be noted that the "packets" of the CDMA system are structurally distinct from the IP "packets" of the packet switched data network. Both are units describing the format in which data is transmitted, but one is optimized for wireless networks and the other is optimized for a packet switched data network. For example, a data packet from an IP source would contain a header portion and a data portion. However, a data packet for transmission over-the-air carries data that has been encoded and modulated, and probably subjected to symbol repetition before being packed into a packet. Hence, a packet from a packet switched data network will have to be reformatted for use on the wireless network. In the embodiments described herein and in the art, the meaning of the word "packet" is to be inferred by the usage of the word.

Since the subject matter of the embodiments is directed towards mobile IP telephony, the terminology of RFC 2002 (October 1996) will also be used forthwith. The protocol promulgated in this document enables a mobile wireless communication device to change the point of attachment to the Internet without having to change the IP address of the device. Namely, RFC 2002 describes a registration scheme that informs a home agent of the location of a mobile communication device so that the home agent can route data packets through foreign agents. A "home agent" is the infrastructure element that processes IP packets at the home system of the access terminal. A "foreign agent" is the infrastructure element that services the access terminal at a visited system. The access terminal is also referred to as a "Mobile Node" (MN).

In reference to FIG. 1, the functions of a foreign agent and/or home agent can be accomplished by a PDSN 20 in a visited network or a PDSN 20 in the home network. Authentication, authorization, and accounting functions are usually performed by a server, which is referred to as an Accounting, Authorization, and Accounting (AAA) Server. The AAA server is communicatively coupled to either a PDSN and/or a BSC.

In cdma2000 1×EV-DO, hereinafter referred to as EV-DO, the wireless communication system entities of FIG. 1 are conceptually simplified to an access terminal and an access network. An access terminal (AT) is any device that allows a user to access a packet switched data network through the EV-DO wireless access network. The access network (AN) comprises any network equipment/entity that provides data connectivity between a packet switched data network and access terminals.

Figure 2:
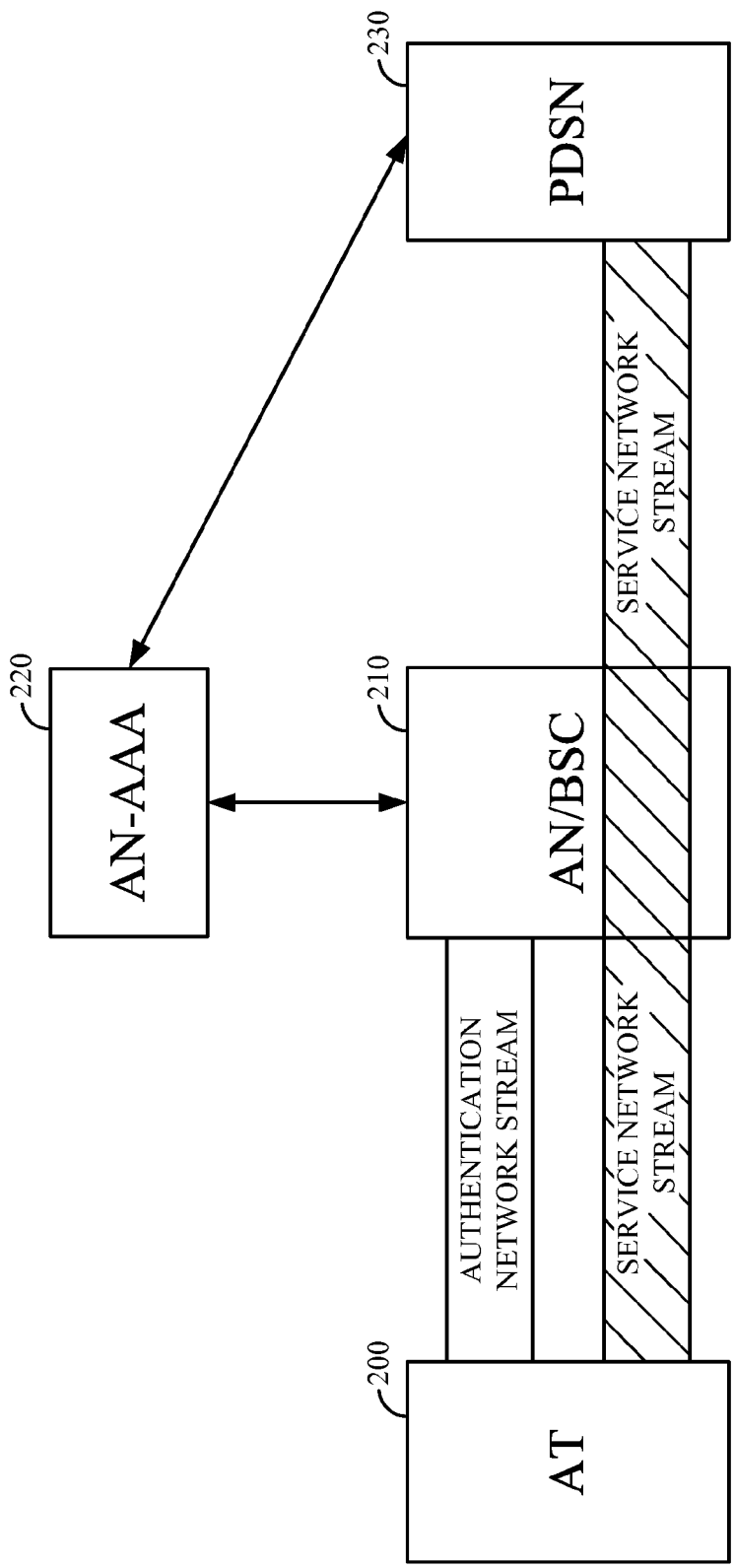
FIG. 2 is a diagram of the data connectivity between an Access Terminal (AT), an Access Network (AN), an AN-Authentication, Authorization, and Accounting (AN-AAA) server, and a PDSN.

FIG. 2 is a diagram of the data connectivity between an AT 200, an AN 210, an AN-AAA server 220, and a PDSN 230. A communication session is established between the AT 200 and the AN 210 when the AT 200 desires access to the PDSN 230. The session is implemented according to PPP protocols and is referred to as the authentication network stream. The AN 210 communicates with the AN-AAA server 220 in order to determine whether to allow the AT 200 access to the PDSN 230. Based upon the authentication information conveyed within the authentication network stream, the AN 210 transparently passes a service network stream between the AT 200 and the PDSN 230. The PDSN 230 further communicates with the AN-AAA server 220 in order to determine whether to allow the AT 200 access to a packet switched data network (not shown). Based upon the authentication information conveyed within the service network stream, the PDSN 230 allows IP traffic between the packet switched data network (not shown) and the AT 200.

Hence, in an EV-DO system, an authentication procedure takes place to ensure that the AT is an authorized subscriber of the wireless network and an authentication procedure takes place to ensure that the AT is the owner of the radio session. Typically, the AT stores the authentication information and the account information required for such procedures in a secure manner. One such authentication procedure is the Challenge Handshake Authentication Protocol (CHAP). Other authentication protocols may be used without undue experimentation in the described embodiments, but for illustrative ease, CHAP will be described herein. Examples of other authentication protocols are the Mobile IP authentication protocol and the Password Authentication Protocol (PAP).

In a challenge/response authentication protocol such as the ones listed above, the user is provided an unpredictable number and is challenged with the task to encrypt the unpredictable number and return a predictable result. If the user is authorized, then the user would have the correct mechanism, either in hardware or in software, to encrypt the unpredictable number in a manner that is expected by the challenger. For example, if the user is authorized, the user and the challenger would have a shared secret key that could be used to encrypt the challenge. Unauthorized users would lack the appropriate secret key to encrypt the challenge into a response that is expected by the challenger.

When a device is tethered to an AT in order to use the AT as a modem to send and receive IP traffic, various complications arise regarding the authentication of the device tethered to the AT. The use of the word "tethered" herein is for describing the connectivity between a device to a wireless communication device. It is envisioned that such connectivity may be through either a physical connection, such as a cable attachments or direct contact, or a nonphysical connection, such as radio connections, optical connections, or infrared connections.

For optimal performance, the tethered device would enter into PPP negotiations directly with the network. However, the tethered device may not be able to perform the authentication procedures necessary for PPP negotiations with the network because the required network security information is stored within the AT, not the tethered device. Passing the network security information from the AT to the tethered device is an option that is highly undesirable due to the potential for misuse of said security information.

One solution is to perform the PPP negotiations and authentication procedures between the AT and the AN, and to subsequently perform the PPP negotiations between the AT and the tethered device without performing the authentication procedures. However, this solution is flawed in that two (2) PPP negotiations would be performed, which introduces an unacceptable time delay. Moreover, this solution is flawed in that the tethered device is not informed that authentication has occurred. It should be noted that an end-to-end PPP negotiation process requires certain procedural steps, such as in authentication, to be completed by each end before the PPP session is fully established.

The embodiments that are described herein are for performing a single end-to-end PPP negotiation that enhances the security of the authentication and account information while satisfying the authentication procedures of both the tethered device and the AT.

Figure 3:
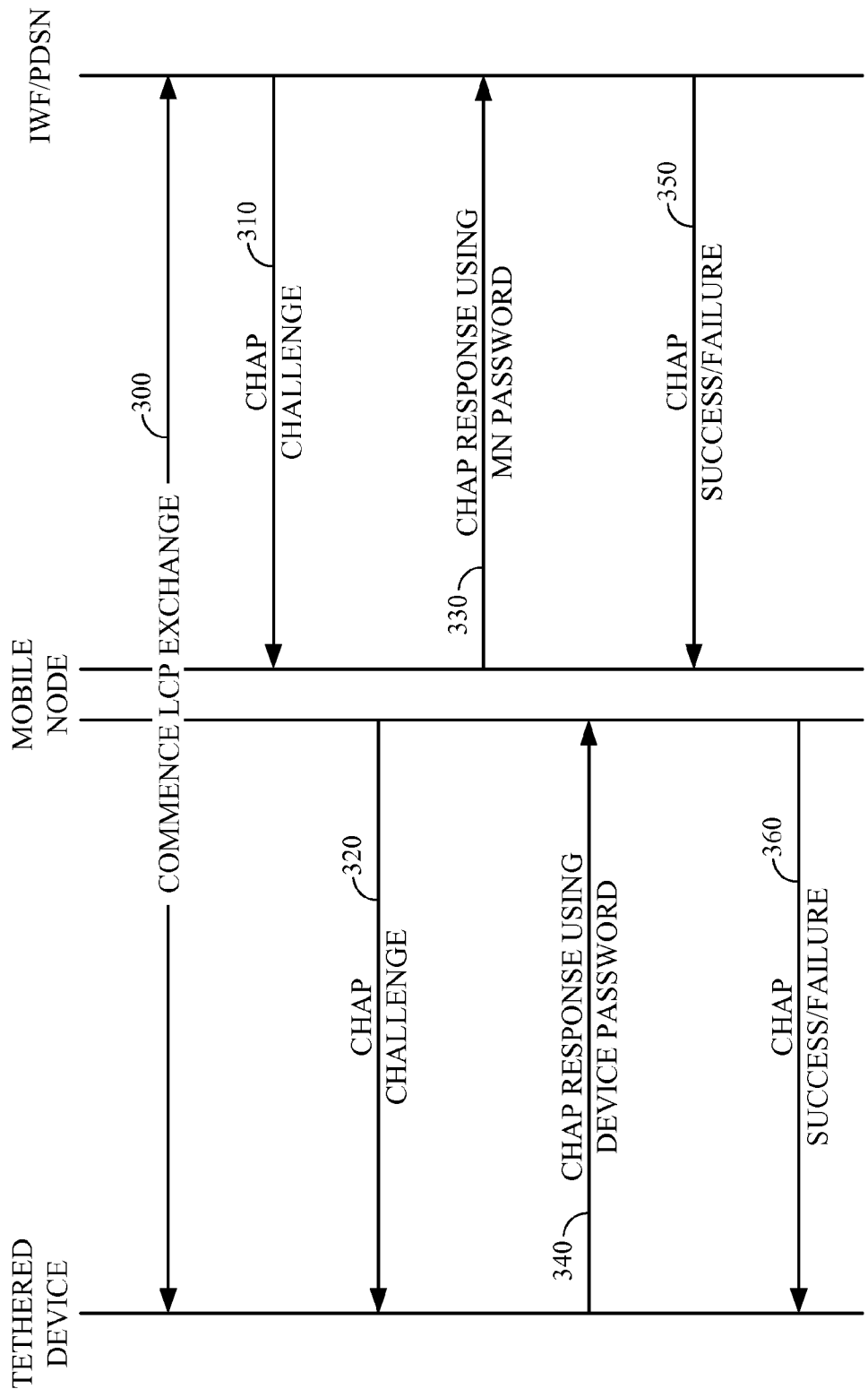
FIG. 3 is an illustration of the program flow for a proxy authentication.

In a first embodiment, hardware within an AT is configured to perform a proxy authentication of the tethered device. Since the AT is being used as a modem for the tethered device, the terminology of the Mobile IP protocol is used in FIG. 3, so that the AT is referred to as a mobile node (MN). FIG. 3 illustrates the high level procedure for the proxy authentication. At instance 300, a tethered device and a PDSN/IWF commence a PPP session using the Link Control Protocol (LCP). LCP is used to establish, configure, maintain and terminate the PPP session. The MN acts as a transparent link between the tethered device and the PDSN/IWF. At instance 310, the PDSN/IWF sends a CHAP challenge to the MN. At instance 320, the MN forwards the CHAP challenge to the tethered device. At instance 330, the MN generates a CHAP response using a password or shared key that is already stored within the MN. Note that the MN generates the CHAP response independently of the tethered device.

At instance 340, the MN receives a CHAP response from the tethered device. Upon receipt of CHAP response from the tethered device, the MN intentionally withholds transmission of the CHAP response from the tethered device to the PDSN/IWF.

At instance 350, the MN receives a CHAP success/failure indicator from the PDSN/IWF. At instance 360, the MN forwards the CHAP success/failure indicator to the tethered device.

Hence, in the manner described above, the first embodiment allows the MN to perform a proxy authentication of a tethered device using CHAP. In other aspects of the embodiment, other challenge/response authentication protocols such as PAP and Mobile IP Authentication may be used. In another embodiment, the MN may interchange the timing of instances 320 and 330, so that the MN may generate a response to the challenge before forwarding the challenge to the tethered device.

In general, the MN acts to intercept a challenge directed to the tethered device, generates an appropriate response to the challenge without waiting for input from the tethered device, forwards the challenge to the tethered device, and ignores the challenge response generated by the tethered device.

If the response generated by the MN is lost, which may occur due to the error-prone nature of the wireless environment, then subsequent challenges retransmitted from the network will ensure that the authentication procedure is completed.

The hardware used to implement the events of FIG. 3 may be processing elements and memory elements configured to execute a set of instructions, wherein the set of instructions are for performing method steps corresponding to the above events. Alternatively, some events may be performed by circuitry that is specific to a given function. For example, the generation of a challenge response may be performed by linear feedback shift registers and adders configured to implement hashing functions or other encryption algorithms.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for performing a proxy authentication of a device tethered to a wireless unit, comprising:
   intercepting a challenge directed to the tethered device;
   generating an appropriate response to the challenge without waiting for input from the tethered device;
   forwarding the challenge to the tethered device; and
   ignoring a challenge response received from the tethered device.

2. The method of claim 1, wherein generating the appropriate response to the challenge comprises using password information associated with the wireless unit to generate the appropriate response rather than using password information associated with the tethered device.

3. The method of claim 1, wherein the authentication is a challenge/response authentication procedure.

4. The method of claim 3, wherein the challenge/response authentication procedure is the Challenge Handshake Authentication Protocol.

5. Apparatus within a wireless unit for performing a proxy authentication of a device tethered to the wireless unit, comprising:
   at least one memory element; and
   at least one processing element configured to execute a set of instructions stored upon the at least one memory element, the set of instructions for:
      intercepting a challenge directed to the tethered device;
      generating an appropriate response to the challenge without waiting for input from the tethered device;
      forwarding the challenge to the tethered device; and
      ignoring a challenge response received from the tethered device.

6. Apparatus for performing a proxy authentication of a device tethered to a wireless unit, comprising:
   means for intercepting a challenge directed to the tethered device;
   means for generating an appropriate response to the challenge without waiting for input from the tethered device;
   means for forwarding the challenge to the tethered device; and
   means for determining to ignore a challenge response received from the tethered device.

7. A method for performing a proxy authentication of a device tethered to a wireless unit, comprising:
   intercepting a challenge directed to the tethered device;
   forwarding the challenge to the tethered device;
   generating an appropriate response to the challenge without waiting for input from the tethered device; and
   ignoring a challenge response received from the tethered device.

8. Apparatus within a wireless unit for performing a proxy authentication of a device tethered to the wireless unit, comprising:
   at least one memory element; and
   at least one processing element configured to execute a set of instructions stored, upon the at least one memory element, the set of instructions for:
      intercepting a challenge directed to the tethered device;
      forwarding the challenge to the tethered device;
      generating an appropriate response to the challenge without waiting for input from the tethered device; and
      ignoring a challenge response received from the tethered device.

* * * * *